US012603302B2

(12) United States Patent
Aono et al.

(10) Patent No.: US 12,603,302 B2
(45) Date of Patent: Apr. 14, 2026

(54) SINGLE CELL FOR FUEL CELL

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 557 days.

(21) Appl. No.: 18/120,509

(22) Filed: Mar. 13, 2023

(65) Prior Publication Data

US 2023/0299309 A1 Sep. 21, 2023

(30) Foreign Application Priority Data

Mar. 16, 2022 (JP) ................................. 2022-041196

(51) Int. Cl.
H01M 8/026 (2016.01)
H01M 8/0284 (2016.01)
H01M 8/1004 (2016.01)
*H01M 8/10* (2016.01)

(52) U.S. Cl.
CPC ......... H01M 8/026 (2013.01); H01M 8/0284 (2013.01); H01M 8/1004 (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 10,658,694 B2 * | 5/2020 | Jilani | .................. | H01M 8/0213 |
| 2012/0100455 A1 * | 4/2012 | Uensal | .................. | H01M 4/881 |
| | | | | 429/480 |
| 2017/0047595 A1 * | 2/2017 | Tsai | ...................... | H01M 8/026 |
| 2018/0159140 A1 * | 6/2018 | Jilani | ................. | H01M 8/0273 |
| 2020/0127299 A1 * | 4/2020 | Shintani | ............. | H01M 8/1018 |
| 2020/0251751 A1 * | 8/2020 | Kawabe | ............. | H01M 8/0256 |

FOREIGN PATENT DOCUMENTS

JP 2013-239316 11/2013

* cited by examiner

*Primary Examiner* — Alix E Eggerding
(74) *Attorney, Agent, or Firm* — Greenblum & Bernstein, P.L.C.

(57) ABSTRACT

A single cell for a fuel cell includes a power generating unit and two separators that hold the power generating unit in between. Each separator includes a facing surface, which faces the power generating unit. Each facing surface includes groove passages and ribs. Each of the ribs includes a top wall portion, two side wall portions, and corner portions. The top wall portion is in contact with the power generating unit. The side wall portions are located at the opposite sides of the top wall portion. Each corner portion is located between the top wall portion and one of the side wall portions. A restricting portion is provided at a section of each corner portion that faces the groove passage. The restricting portion restricts the gas diffusion layer from sinking into the groove passage. The restricting portion is a conductive porous body.

7 Claims, 3 Drawing Sheets

41 (91)
44 (94)
46 (96)
48B
40b
40B
48A (48C)
40 (90) 45 (95)
47B
47B 47A (47C)
40a
40A
48B
43 (93)
42 (92)

21 (91)
24 (94)
26 (96)
27
17 (13)
10 (90)
20 (90)
25 (95)
23 (93)
22 (92)
16 (12)

31 (91)
34 (94)
36 (96)
37B
30a
30A
37A (37C)
30 (90)
35 (95)
38B
38B
38A (38C)
30B
30b
37B
33 (93)
32 (92)

SINGLE CELL FOR FUEL CELL

BACKGROUND

1. Field

The present disclosure relates to a single cell for a fuel cell.

2. Description of Related Art

Japanese Laid-Open Patent Publication No. 2013-239316 discloses a fuel cell. The fuel cell includes a power generating unit, which is referred to as an electrolyte membrane electrode structure, and a plastic frame member arranged at the outer periphery of the power generating unit.

The fuel cell also includes two separators that hold the power generating unit and the frame member between them.

The power generating unit includes a solid polymer electrolyte membrane, an anode, and a cathode. The anode and the cathode hold the solid polymer electrolyte membrane between them.

The anode and the cathode each include a catalyst layer and a gas diffusion layer stacked on the catalyst layer.

Each separator includes groove passages in a surface that faces the power generating unit. A fuel gas or an oxidant gas (hereinafter, referred to as a reactant gas) flows through the groove passages.

In such a fuel cell, sections of the gas diffusion layer that face the groove passages may be deformed to bend and thus sink into the groove passages. The sunk sections of the gas diffusion layer act as resistance to the flow of reactant gas flowing through the groove passages and thus can increase the pressure loss of the reactant gas.

SUMMARY

Accordingly, it is an objective of the present disclosure to provide a single cell for a fuel cell that restricts a gas diffusion layer from sinking into groove passages, while maintaining the diffusivity of the reactant gas.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a single cell for a fuel cell includes a power generating unit and two separators. The power generating unit includes a membrane electrode assembly and two gas diffusion layers. The gas diffusion layers hold the membrane electrode assembly in between. The two separators hold the power generating unit in between. Each separator includes a facing surface that faces the power generating unit. Each facing surface includes groove passages and ribs. The groove passages are configured to allow a reactant gas to flow therethrough. The ribs are located between the groove passages and protrude toward the power generating unit. The ribs each include a top wall portion, two side wall portions, and corner portions. The top wall portion is in contact with the power generating unit. The two side wall portions are located at opposite sides of the top wall portion in an arrangement direction of the groove passages. The corner portions are each located between the top wall portion and one of the side wall portions. A restricting portion is provided at a section of each corner portion that faces the groove passage. The restricting portion restricts the gas diffusion layer from sinking into the groove passage. The restricting portion is a conductive porous body.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
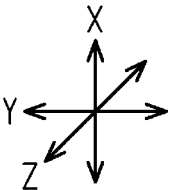
FIG. 1 is an exploded perspective view of a single cell for a fuel cell according to one embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A single cell 90 for a fuel cell according to one embodiment will now be described with reference to FIGS. 1 and 2. For illustrative purposes, some parts of the structures in the drawings are exaggerated or simplified, and the dimensional ratios of the structures may be different from the actual ratios. The term "orthogonal" is not necessarily used in a strict sense, but may be used in cases where elements are generally orthogonal to each other within ranges in which such configuration achieves the operational advantages of the respective embodiments.

<Single Cell 90 for Fuel Cell>

Figure 2:
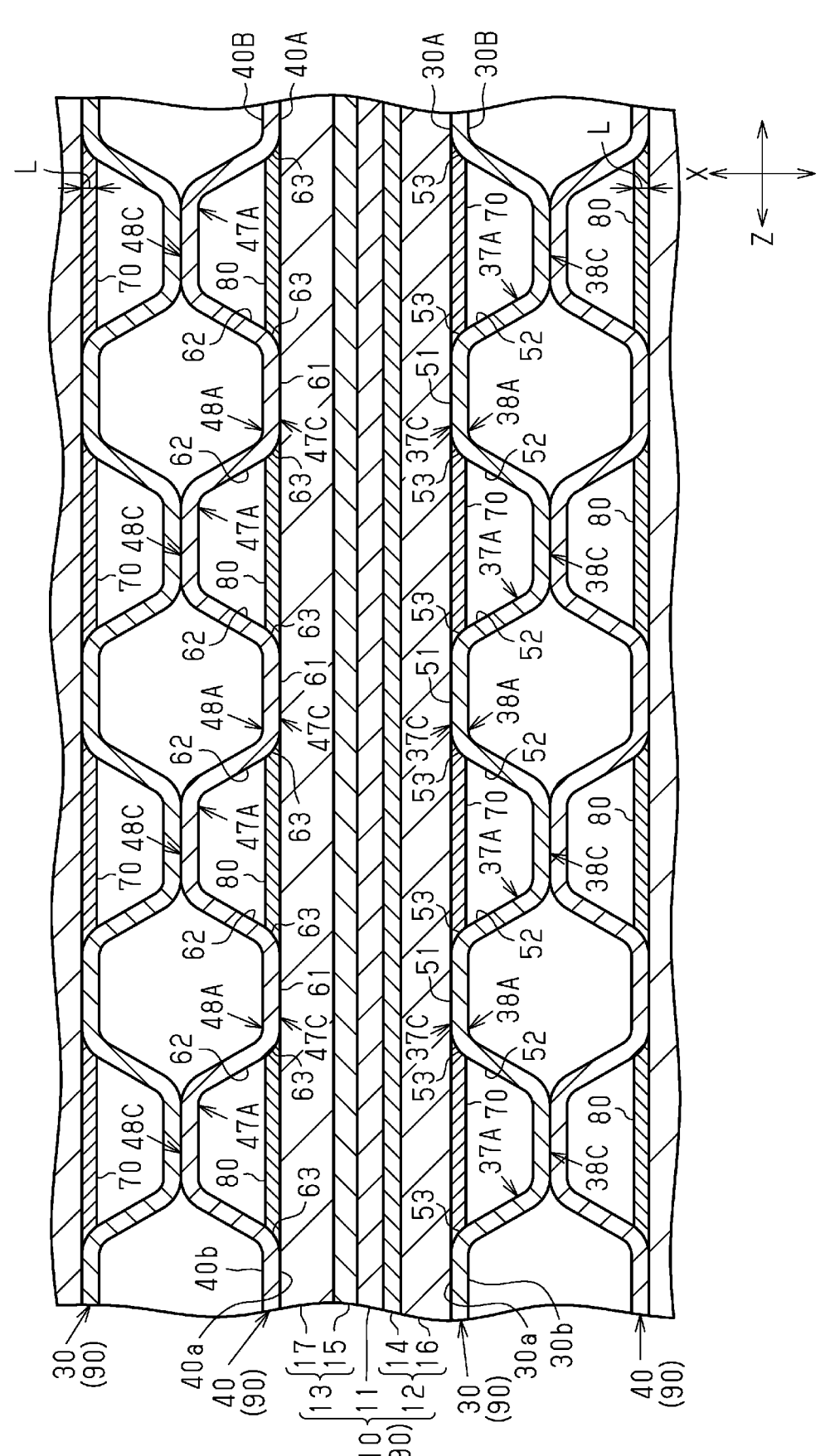
FIG. 2 is a cross-sectional view showing a state in which multiple single cells shown in FIG. 1 are stacked.

As shown in FIGS. 1 and 2, the single cell 90 for a fuel cell includes a power generating unit 10, a frame member 20 that holds the power generating unit 10, separators 30, 40, and restricting portions 70, 80. The power generating unit 10 and the frame member 20 are held between the separators 30, 40. The restricting portions 70, 80 are not illustrated in FIG. 1. FIG. 2 shows a state in which multiple single cells 90 are stacked in the vertical direction with the separators 30 facing downward in the vertical direction.

The single cell 90 is a rectangular plate as a whole.

In the following description, the direction in which the separator 30, the layer including the power generating unit 10 and the frame member 20, and the separator 40 are stacked will be referred to as a first direction X. In the present embodiment, the first direction X is the vertical direction. Among directions orthogonal to the first direction X, a longitudinal direction of the single cell 90 will be referred to as a second direction Y. Also, a direction that is orthogonal to both the first direction X and the second direction Y will be referred to as a third direction Z.

The single cell 90 has inlet manifolds 91, 93, 95 for introducing reactant gas and cooling medium into the single cell 90 and outlet manifolds 92, 94, 96 for discharging the reactant gas and the cooling medium in the single cell 90 to the outside. In the present embodiment, the inlet manifold 91 and the outlet manifold 92 are manifolds through which fuel gas, which is reactant gas, flows. The fuel gas is, for example, hydrogen gas. The inlet manifold 93 and the outlet manifold 94 are manifolds through which cooling medium flows. The cooling medium is, for example, coolant. The inlet manifold 95 and the outlet manifold 96 are manifolds through which oxidant gas, which is reactant gas, flows. The oxidant gas is, for example, air.

The inlet manifolds 91, 93, 95 and the outlet manifolds 92, 94, 96 each have a rectangular shape in plan view, and extend in the first direction X through the single cell 90.

The inlet manifold 91 and the outlet manifolds 94, 96 are located on a first side in the second direction Y of the single cell 90 (on the left side in the left-right direction in FIG. 1). The inlet manifold 91 and the outlet manifolds 94, 96 are arranged in that order from a first side in the third direction Z (the back side of the sheet of FIG. 1) toward a second side in the third direction Z (the front side of the sheet of FIG. 1).

The outlet manifold 92 and the inlet manifolds 93, 95 are located on a second side in the second direction Y of the single cell 90 (on the right side in the in FIG. 1). The outlet manifold 92 and the inlet manifolds 93, 95 are arranged in that order from the second side in the third direction Z (the front side of the sheet of FIG. 1) toward the first side in the third direction Z (the back side of the sheet of FIG. 1).

Each component of the single cell 90 will now be described.

<Power Generating Unit 10>

As shown in FIGS. 1 and 2, the power generating unit 10 includes a solid polymer electrolyte membrane (hereinafter referred to as an electrolyte membrane 11) and electrodes 12, 13 respectively provided on opposite surfaces of the electrolyte membrane 11. In the present embodiment, the electrode that is joined to a first side in the first direction X (the lower side in the up-down direction in FIG. 1) of the electrolyte membrane 11 is an anode 12. Also, the electrode joined to a second side in the first direction X (the upper side in the in FIG. 1) of the electrolyte membrane 11 is a cathode 13.

The anode 12 includes a catalyst layer 14 joined to the first side (lower side in FIG. 1) of the electrolyte membrane 11 and a gas diffusion layer 16 joined to the catalyst layer 14.

The cathode 13 includes a catalyst layer 15 joined to the second side (upper side in FIG. 1) of the electrolyte membrane 11 and a gas diffusion layer 17 joined to the catalyst layer 15.

Specifically, a membrane catalyst layer assembly including the electrolyte membrane 11 and the two catalyst layers 14, 15 is held between the two gas diffusion layers 16 and 17. In the present embodiment, the membrane catalyst layer assembly corresponds to a membrane electrode assembly according to the present disclosure.

<Frame Member 20>

As shown in FIG. 1, the frame member 20 has a rectangular shape elongated in the second direction Y and is made of, for example, plastic.

The frame member 20 includes through-holes 21, 22, 23, 24, 25, 26, which are parts of the respective manifolds 91, 92, 93, 94, 95, 96.

The frame member 20 includes an opening 27 in a center. The power generating unit 10 is joined to the peripheral edge of the opening 27 from a second side in the first direction X (upper side as viewed in FIG. 1).

<Separator 30>

As shown in FIGS. 1 and 2, the separator 30 is formed by pressing, for example, a metal member that is made of titanium or stainless steel and has a rectangular shape in plan view.

The separator 30 includes through-holes 31, 32, 33, 34, 35, 36, which are parts of the respective manifolds 91, 92, 93, 94, 95, 96 (refer to FIG. 1).

The separator 30 includes a first surface 30A and a second surface 30B. The first surface 30A includes a facing surface 30a, which faces the anode 12 of the power generating unit 10 in the first direction X. The second surface 30B includes an opposite surface 30b, which is located on a side opposite to the facing surface 30a.

The first surface 30A is provided with groove passages 37A, through which the fuel gas flows, and two connecting portions 37B. Also, the first surface 30A is provided with ribs 37C, which are located between the groove passages 37A and protrude toward the gas diffusion layer 16 of the power generating unit 10. In FIG. 1, the groove passages 37A, the connecting portions 37B, and the ribs 37C are illustrated in a simplified manner.

The groove passages 37A and the ribs 37C are provided in the facing surface 30a.

The groove passages 37A are arranged side by side in the third direction Z while being spaced apart from each other (refer to FIG. 2). Each of the groove passages 37A extends linearly in the second direction Y (refer to FIG. 1). In the present embodiment, the second direction Y corresponds to an extending direction of groove passages according to the present disclosure, and the third direction Z corresponds to an arrangement direction of the groove passages according to the present disclosure.

The ribs 37C are arranged side by side in the third direction Z while being spaced apart from each other (refer to FIG. 2). Each of the ribs 37C extends linearly in the second direction Y (refer to FIG. 1).

As shown in FIG. 2, each of the ribs 37C includes a top wall portion 51, two side wall portions 52, and corner portions 53. The side wall portions 52 are located at opposite sides of the top wall portion 51 in the third direction Z. Each corner portion 53 is located between the top wall portion 51 and a side wall portion 52.

The top wall portion 51 is in contact with the gas diffusion layer 16 of the power generating unit 10. In the present embodiment, the top wall portion 51 is in contact with the gas diffusion layer 16 over the entire rib 37C in the second direction Y.

The two side wall portions 52 are inclined such that the distance between them in the third direction Z increases toward the side opposite to the gas diffusion layer 16 in the first direction X.

The corner portions 53 are curved so as to separate away from the gas diffusion layer 16 in the first direction X as the corner portions 53 extend away from the top wall portion 51 in the third direction Z increases.

As shown in FIG. 1, the two connecting portions 37B respectively extend from the opposite sides of the groove passages 37A in the second direction Y toward the through-holes 31, 32. The fuel gas is introduced from the inlet manifold 91 to the groove passages 37A via one of the connecting portions 37B. The fuel gas flowing through the groove passages 37A is discharged to the outlet manifold 92 via the other connecting portion 37B.

As shown in FIGS. 1 and 2, the second surface 30B is provided with groove passages 38A and two connecting portions 38B, through which the cooling medium flows, and ribs 38C, which are located between the groove passages 38A and protrude away from the ribs 37C in the first direction X. In FIG. 1, the groove passages 38A, the connecting portions 38B, and the ribs 38C are illustrated in a simplified manner.

As shown in FIG. 2, each groove passage 38A is formed by the back side of the corresponding rib 37C. Also, each rib 38C is formed by the back side of the corresponding groove passage 37A.

As indicated by broken lines in FIG. 1, the two connecting portions 38B respectively extend from the opposite sides of the groove passages 38A in the second direction Y toward the through-holes 33, 34. The cooling medium is introduced from the inlet manifold 93 to the groove passages 38A via one of the connecting portions 38B. The cooling medium flowing through the groove passages 38A is discharged to the outlet manifold 94 via the other connecting portion 38B.

<Separator 40>

As shown in FIGS. 1 and 2, the separator 40 is formed by pressing, for example, a metal member that is made of titanium or stainless steel and has a rectangular shape in plan view.

The separator 40 includes through-holes 41, 42, 43, 44, 45, 46, which are parts of the respective manifolds 91, 92, 93, 94, 95, 96 (refer to FIG. 1).

The separator 40 includes a first surface 40A and a second surface 40B. The first surface 40A includes a facing surface 40a, which faces the cathode 13 of the power generating unit 10 in the first direction X. The second surface 40B includes an opposite surface 40b, which is located on a side opposite to the facing surface 40a.

The first surface 40A is provided with groove passages 47A and two connecting portions 47B, through which the oxidant gas flows. Also, the first surface 40A is provided with ribs 47C, which are located between the groove passages 47A and protrude toward the gas diffusion layer 17 of the power generating unit 10. In FIG. 1, the groove passages 47A, the connecting portions 47B, and the ribs 47C are illustrated in a simplified manner.

The groove passages 47A and the ribs 47C are provided in the facing surface 40a.

The groove passages 47A are arranged side by side in the third direction Z while being spaced apart from each other (refer to FIG. 2). Each of the groove passages 47A extends linearly in the second direction Y (refer to FIG. 1).

The ribs 47C are arranged side by side in the third direction Z while being spaced apart from each other (refer to FIG. 2). Each of the ribs 47C extends linearly in the second direction Y (refer to FIG. 1).

As shown in FIG. 2, each of the ribs 47C includes a top wall portion 61, two side wall portions 62, and corner portions 63. The side wall portions 62 are located at opposite sides of the top wall portion 61 in the third direction Z. Each corner portion 63 is located between the top wall portion 61 and a side wall portion 62.

The top wall portion 61 is in contact with the gas diffusion layer 17 of the power generating unit 10. In the present embodiment, the top wall portion 61 is in contact with the gas diffusion layer 17 over the entire rib 47C in the second direction Y.

The two side wall portions 62 are inclined such that the distance between them in the third direction Z increases toward the side opposite to the gas diffusion layer 17 in the first direction X.

The corner portions 63 are curved so as to separate away from the gas diffusion layer 17 in the first direction X as the corner portions 63 extend away from the top wall portion 61 in the third direction Z increases.

As indicated by broken lines in FIG. 1, the two connecting portions 47B respectively extend from the opposite sides of the groove passages 47A in the second direction Y toward the through-holes 45, 46. The oxidant gas is introduced from the inlet manifold 95 to the groove passages 47A via one of the connecting portions 47B. The oxidant gas flowing through the groove passages 47A is discharged to the outlet manifold 96 via the other connecting portion 47B.

As shown in FIGS. 1 and 2, the second surface 40B is provided with groove passages 48A and two connecting portions 48B, through which the cooling medium flows, and ribs 48C, which are located between the groove passages 48A and protrude away from the ribs 47C in the first direction X. In FIG. 1, the groove passages 48A, the connecting portions 48B, and the ribs 48C are illustrated in a simplified manner.

As shown in FIG. 2, each groove passage 48A is formed by the back side of the corresponding rib 47C. Also, each rib 48C is formed by the back side of the corresponding groove passage 47A.

As shown in FIG. 1, the two connecting portions 48B respectively extend from the opposite sides of the groove passages 48A in the second direction Y toward the through-holes 43, 44. The cooling medium is introduced from the inlet manifold 93 to the groove passages 48A via one of the connecting portions 48B. The cooling medium flowing through the groove passages 48A is discharged to the outlet manifold 94 via the other connecting portion 48B.

<Restricting Portions 70, 80>

As shown in FIG. 2, the restricting portions 70, which are conductive porous bodies, are provided at sections of the corner portions 53 that face the groove passages 37A.

Each restricting portion 70 is provided on both corner portions 53 at the opposite sides of the corresponding groove passage 37A. The restricting portion 70 continuously extends in the third direction Z from one of the corner portions 53 to the other corner portion 53 along the gas diffusion layer 16.

The restricting portion 70 is in contact with the gas diffusion layer 16 over the entire area in the third direction Z. That is, the gaps between the corner portions 53 and the gas diffusion layer 16 in the first direction X are filled with the restricting portion 70. In the present embodiment, the restricting portion 70 is provided over the entire length of the groove passage 37A in the second direction Y.

The restricting portions 70 are configured to restrict the gas diffusion layer 16 from sinking into the groove passages 37A.

As shown in FIG. 2, the restricting portions 80, which are conductive porous bodies, are provided at sections of the corner portions 63 that face the groove passages 47A.

Each restricting portion 80 is provided on both corner portions 63 at the opposite sides of the corresponding groove passage 47A. The restricting portion 80 continuously extends in the third direction Z from one of the corner portions 63 to the other corner portion 63 along the gas diffusion layer 17.

The restricting portion 80 is in contact with the gas diffusion layer 17 over the entire area in the third direction Z. That is, the gaps between the corner portions 63 and the gas diffusion layer 17 in the first direction X are filled with the restricting portion 80. In the present embodiment, the restricting portion 80 is provided over the entire length of the groove passage 47A in the second direction Y.

The restricting portions 70, 80 are, for example, porous bodies made of particulate or fibrous conductive members and a resin that binds the conductive members together.

Examples of the material for particulate conductive members include a metal such as gold (Au), platinum (Pt), titanium (Ti), titanium nitride (TiN), copper (Cu), and cobalt (Co); a compound containing any of these metals; and carbon powder such as graphene or graphite.

Examples of the material for fibrous conductive members include carbon fibers such as carbon nanotubes and graphite nanofibers.

Examples of the resin include thermoplastic resins such as polyethylene (PE), polypropylene (PP), polystyrene (PS), polyamide (PA), polycarbonate (PC), polyphenylene ether (PPE), polyethylene terephthalate (PET), polyethylene naphthalate (PEN), polyethersulfone (PES), polyphenylene sulfide (PPS), polyphenylsulfone (PPSU), polyetherether ketone (PEEK), polyimide (PI), liquid crystal polymer (LCP), and cycloolefin polymer (COP); thermosetting resins such as epoxy resin; polymer alloys obtained by combining any of the above-listed resins; and fluoropolymers such as polytetrafluoroethylene (PTFE), perfluoroethylene propylene copolymer (FEP), perfluoroalkoxy alkane (PFA), ethylene tetrafluoroethylene copolymer (ETFE), and polyvinylidene fluoride (PVDF). In place of the resins described above, a rubber such as ethylene propylene diene rubber (EPDM), fluorine rubber, or silicone rubber may be used.

The porosity of the restricting portions 70, 80 is preferably greater than or equal to the porosity of the gas diffusion layers 16, 17. In addition, the porosity of the restricting portions 70, 80 is more preferably greater than or equal to the porosity of the gas diffusion layers 16, 17 within a range greater than or equal to 70%. The porosity of the restricting portions 70, 80 is further more preferably set to be greater than or equal to the porosity of the gas diffusion layers 16, 17 within a range greater than or equal to 70% and less than or equal to 80%. In the present embodiment, the porosity of the restricting portions 70, 80 and the porosity of the gas diffusion layers 16, 17 are all set to 70%.

A measurement L of the restricting portions 70, 80 in the first direction X is set to be within a range of 30 μm to 150 μm.

Operation of the present embodiment will now be described.

As shown in FIG. 2, when multiple single cells 90 are stacked with the separators 30 facing downward in the vertical direction, the restricting portions 70 restrict the gas diffusion layers 16 from sinking into the groove passages 37A. In the configuration of the present embodiment, the gaps between the corner portions 53 and the gas diffusion layer 16 in the first direction X are filled with the restricting portions 70. Therefore, the gas diffusion layer 16 applies load on the corner portions 53 of the separator 30 via the restricting portions 70. The gaps between the corner portions 63 and the gas diffusion layer 17 in the first direction X are filled with the restricting portions 80. Therefore, the corner portions 63 of the separator 40 apply load to the gas diffusion layer 17 via the restricting portions 80. This configuration reduces the contact resistance between the separator 30 and the gas diffusion layer 16 and the contact resistance between the separator 40 and the gas diffusion layer 17.

The restricting portions 70, 80 are conductive porous bodies. Some of the fuel gas flowing through the groove passages 37A thus passes through the inside of the restricting portions 70 and is diffused into the gas diffusion layer 16. Also, some of the oxidant gas flowing through the groove passages 47A passes through the inside of the restricting portions 80 and is diffused into the gas diffusion layer 17.

The present embodiment has the following advantages.

(1) The separator 30 includes the facing surface 30*a*, which faces the power generating unit 10. The facing surface 30*a* includes the ribs 37C. Each of the ribs 37C is located between two of the groove passages 37A, through which fuel gas flows, and protrudes toward the gas diffusion layer 16 of the power generating unit 10. Each of the ribs 37C includes a top wall portion 51, two side wall portions 52, and corner portions 53. The top wall portion 51 is in contact with the gas diffusion layer 16 of the power generating unit 10. The side wall portions 52 are located at the opposite sides of the top wall portion 51 in the third direction Z. Each corner portion 53 is located between the top wall portion 51 and one of the side wall portions 52. A restricting portion 70 is provided at sections of the corner portions 53 that face the groove passage 37A. The restricting portion 70 restricts the gas diffusion layer 16 from sinking into the groove passage 37A. The restricting portion 70 is a conductive porous body.

The above-described configuration operates in the above-described manner. The configuration thus restricts the gas diffusion layer 16 from sinking into the groove passages 37A, while maintaining the diffusivity of fuel gas.

(2) Each restricting portion 70 is provided over the entire length of the corresponding groove passage 37A in the second direction Y.

This configuration restricts the gas diffusion layer 16 from sinking into the groove passages 37A over the entire groove passages 37A in the extending direction, while maintaining the diffusivity of the fuel gas.

(3) The porosity of the restricting portions 70, 80 is greater than or equal to the porosity of the gas diffusion layers 16, 17.

If the porosity of the restricting portions 70 (80) is lower than the porosity of the gas diffusion layers 16, 17, the restricting portion 70 (80) may become an obstacle when the fuel gas (oxidant gas) flowing through the groove passages 37A (47A) is diffused into the gas diffusion layer 16 (17). This may reduce the diffusivity of fuel gas (oxidizing gas).

In this regard, with the above-described configuration, the porosity of the restricting portion 70 (80) is greater than or equal to the porosity of the gas diffusion layer 16 (17). Thus, some of the fuel gas (oxidant gas) flowing through the groove passages 37A (47A) easily passes through the inside of the restricting portion 70 (80). This prevents the above-described disadvantages from occurring.

(4) The restricting portions 70, 80 each include particulate or fibrous conductive members and a resin that binds the conductive members together.

With this configuration, the regulating portions 70,80 are formed easily.

<Modifications>

The above-described embodiment may be modified as follows. The above-described embodiment and the following modifications can be combined as long as the combined modifications remain technically consistent with each other.

The shapes of the inlet manifolds 91, 93, 95 and the outlet manifolds 92, 94, 96 are not limited to rectangular shapes in plan view as in the above-described embodiments. For example, the shapes of the manifolds 91, 92, 93, 94, 95, 96 may be a quadrangular shape including a square in plan view, or may be a polygonal shape including a triangle and a pentagon in plan view. The shapes may be circular shapes in plan view such as an oval and a stadium shape.

The flows of the reactant gas and the cooling medium through the manifolds 91, 92, 93, 94, 95, 96 are not limited to those described in the above-described embodiment. For example, the manifold 96 may be used as an inlet manifold for the oxidant gas, and the manifold 95 may be used as an outlet manifold for the oxidant gas. Accordingly, the manifold 94 may be used as an inlet manifold for the cooling medium, and the manifold 93 may be used as an outlet manifold for the cooling medium. That is, the oxidant gas that flows through the groove passages 47A and the cooling medium that flows through the groove passages 38A, 48A may flow in the same direction as the fuel gas flowing through the groove passages 37A.

The groove passages 37A (38A) are not limited to extending linearly in the second direction Y as in the above-described embodiment. For example, the groove passages 37A (38A) may extend in wavy shapes in a planar direction of the facing surface 30a (the opposite surface 30b). In this case, the ribs 37C (ribs 38C) extend in wavy shapes in a planar direction of the facing surface 30a (opposite surface 30b).

The groove passages 47A (48A) are not limited to extending linearly in the second direction Y as in the above-described embodiment. For example, the groove passages 47A (48A) may extend in wavy shapes in a planar direction of the facing surface 40a (the opposite surface 40b). In this case, the ribs 47C (the rib 48C) extend in wavy shapes in a planar direction of the facing surface 40a (the opposite surface 40b).

The shape of the ribs 37C is not limited to the one described in the above-described embodiment. For example, the side wall portions 52 are not limited to being inclined as in the above-described embodiment, but may be orthogonal to the top wall portion 51. Also, the corner portions 53 are not limited to being curved as in the above-described embodiment, but may be provided between the top wall portion 51 and the side wall portions 52 bent and extending from the top wall portion 51.

The shape of the ribs 47C is not limited to the one described in the above-described embodiment. For example, the side wall portions 62 are not limited to being inclined as in the above-described embodiment, but may be orthogonal to the top wall portion 61. Also, the corner portions 63 are not limited to being curved as in the above-described embodiment, but may be provided between the top wall portion 61 and the side wall portions 62 bent and extending from the top wall portion 61.

The restricting portions 70, 80 do not necessarily include a resin that binds conductive members together as in the above-described embodiment. For example, the restricting portions 70, 80 may be made of only conductive members.

Figure 3:
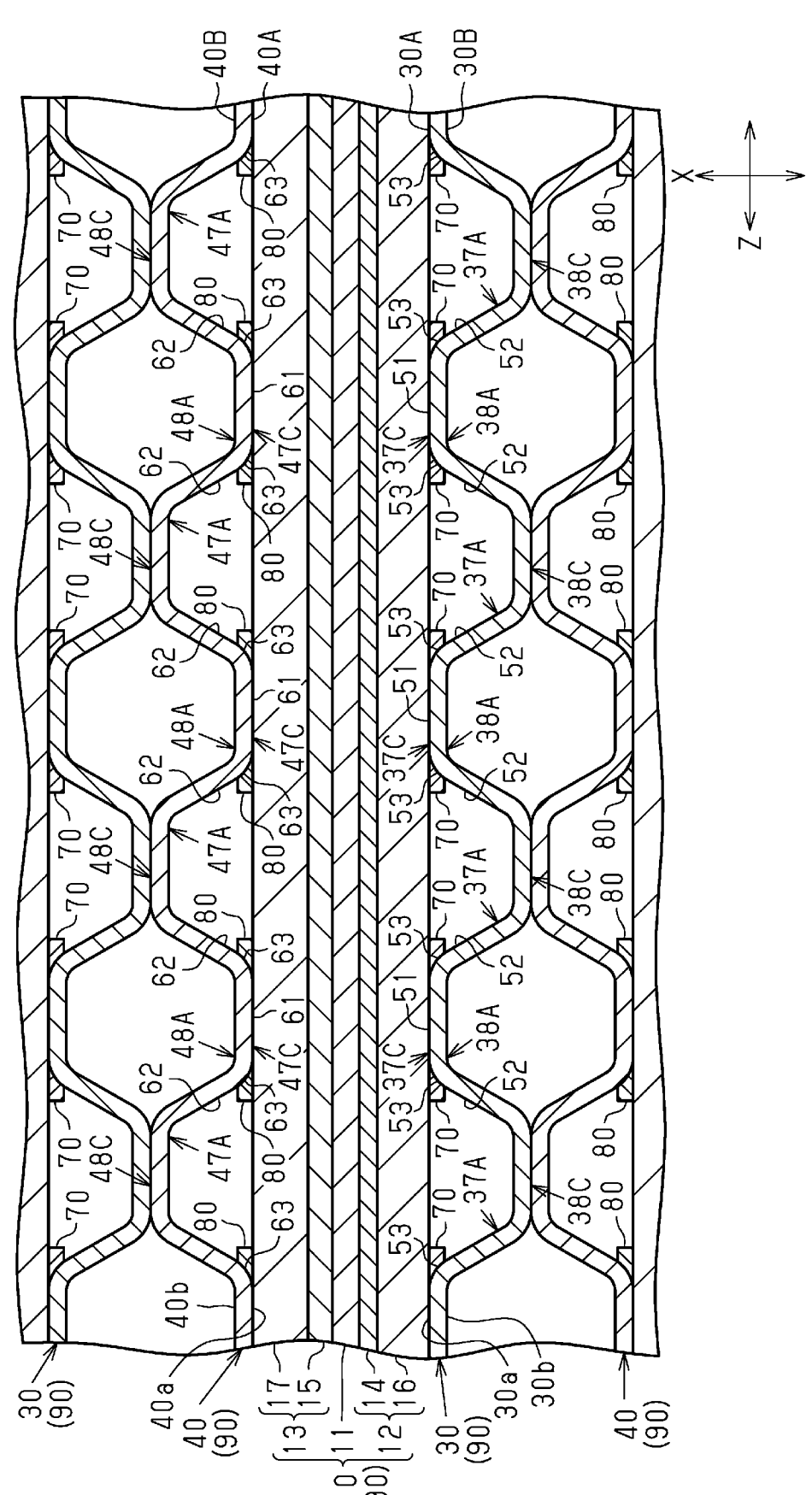
FIG. 3 is a cross-sectional view corresponding to FIG. 2, illustrating single cells for a fuel cell according to a modification.

Each restricting portion 70 does not necessarily need to continuously extend in the third direction Z from one of the two corner portions 53, which are arranged at the opposite sides of the corresponding groove passage 37A, to the other corner portion 53 along the gas diffusion layer 16 as in the above-described embodiment. For example, the restricting portion 70 may be provided only at the corner portions 53. Specifically, as shown in FIG. 3, the restricting portion 70 may be split into two sections in each groove passage 37A and located between the groove passage 37A and the gas diffusion layer 16. The sections of the restricting portion 70 are provided at the corner portions 53 while being spaced apart from each other in the third direction Z.

This configuration reduces the material for the restricting portions 70.

Each restricting portion 80 does not necessarily need to continuously extend in the third direction Z from one of the two corner portions 63, which are arranged at the opposite sides of the corresponding groove passage 47A, to the other corner portion 63 along the gas diffusion layer 17 as in the above-described embodiment. For example, the restricting portion 80 may be provided only at the corner portions 63. Specifically, as shown in FIG. 3, the restricting portion 80 may be split into two sections in each groove passage 47A and located between the groove passage 47A and the gas diffusion layer 17. The sections of the restricting portion 70 are provided at the corner portions 63 while being spaced apart from each other in the third direction Z.

This configuration reduces the material for the restricting portions 80.

The porosity of the restricting portions 70, 80 is not limited to 70% as in the above-described embodiment, but may be changed as long as the porosity is greater than or equal to the porosity of the gas diffusion layers 16, 17. In addition, the porosity of the restricting portions 70, 80 may be less than the porosity of the gas diffusion layers 16, 17 as long as the porosity of the restricting portions 70, 80 is within a range in which the advantages of the above-described embodiment are achieved.

Each restricting portion 70 does not necessarily need to be provided over the entire length of the corresponding groove passage 37A in the second direction Y. Instead, the restricting portion 70 may be split into two or more sections that are spaced apart from each other in the second direction Y.

Each restricting portion 80 does not necessarily need to be provided over the entire length of the corresponding groove passage 47A in the second direction Y. Instead, the restricting portion 80 may be split into two or more sections that are spaced apart from each other in the second direction Y.

The single cells 90 do not necessarily need to be stacked with the separators 30 facing downward in the vertical direction as in the above-described embodiment, but may be stacked with the separators 40 facing downward in the vertical direction.

With this configuration, the restricting portions 80 prevent the gas diffusion layer 17 from sinking into the groove passages 47A. In this case, since the restricting portions 80 are conductive porous bodies, some of the oxidant gas flowing through the groove passages 47A passes through the inside of the restricting portions 80 and is diffused into the gas diffusion layer 17. The configuration thus restricts the gas diffusion layer 17 from sinking into the groove passages 47A, while maintaining the diffusivity of oxidant gas.

The separators 30, 40 do not necessarily need to be formed by pressing metal plates, but may be formed by cutting or etching.

The material for the separators 30, 40 is not limited to titanium or stainless steel, but may be aluminum. Also, a material other than metal such as carbon may be used.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A single cell for a fuel cell, comprising:

a power generating unit that includes a membrane electrode assembly and two gas diffusion layers, the gas diffusion layers holding the membrane electrode assembly in between; and two separators that hold the power generating unit in between, wherein each separator includes a facing surface that faces the power generating unit, each facing surface includes groove passages, which are configured to allow a reactant gas to flow therethrough, and ribs, the ribs being located between the groove passages and protruding toward the power generating unit, the ribs each include:

a top wall portion that is in contact with the power generating unit;

two side wall portions that are located at opposite sides of the top wall portion in an arrangement direction of the groove passages; and corner portions each located between the top wall portion and one of the side wall portions, a restricting portion is provided at a section of each corner portion that faces the groove passage, the restricting portion restricting the gas diffusion layer from sinking into the groove passage, the restricting portion is a conductive porous body, and the restricting portion continuously extends in the arrangement direction from one of two corner portions, which are arranged at opposite sides of the groove passage, to the other of the two corner portions along the gas diffusion layer.

2. The single cell for the fuel cell according to claim 1, wherein each restricting portion is provided over the entire corresponding groove passage in an extending direction of the groove passages.

3. The single cell for the fuel cell according to claim 1, wherein a porosity of the restricting portions is greater than or equal to a porosity of the gas diffusion layers.

4. The single cell for the fuel cell according to claim 1, wherein the restricting portions each include particulate or fibrous conductive members and a resin that binds the conductive members together.

5. The single cell for the fuel cell according to claim 1, wherein the two side wall portions are inclined such that the distance between them in the arrangement direction increases toward the side opposite to the gas diffusion layer in a direction in which the power generating unit and the two separators are stacked.

6. The single cell for the fuel cell according to claim 1, wherein the corner portions are curved so as to separate away from the gas diffusion layer in a direction in which the power generating unit and the two separators are stacked as the corner portions extend away from the top wall portion in the arrangement direction increases.

7. A single cell for the fuel cell, comprising:

a power generating unit that includes a membrane electrode assembly and two gas diffusion layers, the gas diffusion layers holding the membrane electrode assembly in between; and two separators that hold the power generating unit in between, wherein each separator includes a facing surface that faces the power generating unit, each facing surface includes groove passages, which are configured to allow a reactant gas to flow therethrough, and ribs, the ribs being located between the groove passages and protruding toward the power generating unit, the ribs each include:

a top wall portion that is in contact with the power generating unit;

two side wall portions that are located at opposite sides of the top wall portion in an arrangement direction of the groove passages; and corner portions each located between the top wall portion and one of the side wall portions, a restricting portion is provided at a section of each corner portion that faces the groove passage, the restricting portion restricting the gas diffusion layer from sinking into the groove passage, the restricting portion is a conductive porous body, and the restricting portions are provided only at the corner portions.

* * * * *